US012566096B2

(12) United States Patent
van der Cammen

(10) Patent No.: US 12,566,096 B2
(45) Date of Patent: Mar. 3, 2026

(54) TEMPERATURE SENSOR CIRCUITS

(71) Applicant: NXP B.V., Eindhoven (NL)

(72) Inventor: Peter van der Cammen, Delft (NL)

(73) Assignee: NXP B.V., Eindhoven (NL)

( * ) Notice: Subject to any disclaimer, the term of this patent is extended or adjusted under 35 U.S.C. 154(b) by 21 days.

(21) Appl. No.: 18/660,128

(22) Filed: May 9, 2024

(65) Prior Publication Data

US 2024/0410764 A1    Dec. 12, 2024

(30) Foreign Application Priority Data

Jun. 7, 2023    (EP) ..................................... 23178034

(51) Int. Cl.
*G01K 7/01*        (2006.01)
*G05F 3/30*        (2006.01)
(52) U.S. Cl.
CPC ..................................... *G01K 7/01* (2013.01); *G05F 3/30* (2013.01)
(58) Field of Classification Search
CPC ...... G01K 7/01; G01K 2219/00; G01K 7/015; G01K 13/00; G01K 1/00; G01K 7/02; G01K 7/021; G05F 3/30; G05F 3/22; G05F 3/222; G05F 3/225; G05F 1/462; G05F 1/463; H03M 1/56; G01R 19/32
See application file for complete search history.

(56) References Cited

U.S. PATENT DOCUMENTS

2009/0238239 A1*    9/2009    Pan ........................... G01K 7/01
                                                                    374/178

FOREIGN PATENT DOCUMENTS

DE        19909086 A1        9/2000

OTHER PUBLICATIONS

A. A. Silverio, "Design of a Wide Temperature Range, High Linearity Time Domain CMOS-Based Temperature Sensor for Wearable IOT Applications," 2021 2nd International Conference on Innovative and Creative Information Technology (ICITech), Salatiga, Indonesia, 2021, pp. 226-230.

(Continued)

*Primary Examiner* — Jung Kim

(57)    ABSTRACT

The disclosure relates to a temperature sensor circuit comprising: a PTAT voltage circuit; a reference current source; a capacitor; a reset switch connected across the capacitor; a comparator configured to compare a voltage across the capacitor to the PTAT voltage and provide a comparator output; a counter circuit configured to increment or decrement an output word depending on the comparator output (U/D), and repeatedly perform the sequential steps of: i) providing a reset signal to momentarily close the reset switch to discharge the capacitor; ii) counting a number of clock cycles corresponding to the output word while the capacitor is charged by the reference current source; and iii) incrementing or decrementing the output word depending on the comparator output, wherein, after repeating the sequential steps, the output word converges to a value corresponding to a temperature of the PTAT voltage circuit.

20 Claims, 10 Drawing Sheets

(56)      References Cited

OTHER PUBLICATIONS

Bakker, Anton and Huijsing, Johan H.; "Micropower CMOS Temperature Sensor with Digital Output"; IEEE Journal of Solid-State Circuits; vol. 31, No. 7, Jul. 1996 (pp. 933-937).
C. Azcona, et al.; "A CMOS quasi-digital temperature sensor for battery operated systems,"€2013 European Conference on Circuit Theory and Design (ECCTD), Dresden, Germany, 2013, pp. 1-4.
Gomes Ruben et al: "On-Chip Digital Temperature Sensor for CMOS Image Sensor", 2018 International Conference On Biomedical Engineering and Applications (ICBEA), IEEE, Jul. 9, 2018 (Jul. 9, 2018), pp. 1-6.

* cited by examiner

TEMPERATURE SENSOR CIRCUITS

CROSS-REFERENCE TO RELATED APPLICATIONS

This application claims priority under 35 U.S.C. § 119 to European patent application number 23178034.7, filed Jun. 7, 2023, the contents of which are incorporated by reference herein.

FIELD

The disclosure relates to temperature sensor circuits.

BACKGROUND

A temperature sensor may be implemented by comparing magnitudes of a temperature dependent signal and a temperature independent signal. A ratio between the two magnitudes contains information about the temperature, which can be converted into a digital word.

Within an integrated circuit (IC), an accurate temperature dependent voltage may for example be obtained when a voltage difference between two nominally identical PN junctions with a fixed current density ratio n (where n #1) is measured. For two diodes with a current density ratio n, the voltage difference $\Delta V_d$ between both diode voltages is given by:

$$\Delta V_d = V_T \ln(n)$$

Where $V_T = kT/q$, $k = 1.38 * 10^{-23}$ J/K (Boltzmann's constant), $q = 1.6 * 10^{-19}$ C (the charge of an electron) and T the absolute temperature in degrees Kelvin.

The only variable in $\Delta V_d$ is the absolute temperature T. For this reason, this voltage is indicated as a 'proportional to absolute temperature' (PTAT) voltage.

A PTAT voltage is also obtained when the difference between two base to emitter voltages ($\Delta V_{be}$) of two identical bipolar transistors with a fixed collector current density ratio n (where n≠1) is taken or the difference between two gate to source voltages ($\Delta V_{gs}$) of two identical MOS transistors, biased in weak inversion, with a fixed drain current density ratio n (where n≠1).

Within an IC, a temperature independent voltage $V_{REF}$ is obtained by taking the voltage drop across a pn junction ($V_{diode}$) and adding to this a (typically amplified) PTAT voltage $V_{PTAT}$ such that the positive temperature coefficient of the $V_{PTAT}$ compensates for the negative temperature coefficient of $V_{diode}$. This is depicted schematically in FIG. 1. At room temperature (around 27° C. or 300K), the temperature slope of $V_{PTAT}$ is designed to compensate exactly for the temperature slope of $V_{diode}$. $V_{diode}$ and $V_{PTAT}$ are about 600 mV each at around 300K but can differ somewhat from this. The negative temperature coefficient from a diode is fairly accurate across process corners but its absolute voltage may vary somewhat. A PTAT voltage is very accurate but since half of $V_{REF}$ comes from $V_{diode}$, $V_{REF}$ has some inaccuracy over process corners with respect to its absolute value.

The diode voltage $V_{diode}$ versus temperature is not a straight line. For this reason the obtained reference voltage $V_{REF}$ (in this example about 1.2V) differs somewhat from the actual 0° K diode voltage (the 'bandgap' voltage). $V_{REF}$ is termed the 'extrapolated bandgap voltage', which is the voltage we would get when the diode temperature characteristic is an ideal straight line.

Instead of using a diode, a base to emitter voltage of a bipolar transistor or a gate to source voltage of a MOS transistor can also be used to generate $V_{REF}$.

Often, the PTAT and REF quantities are needed as currents (which can be obtained by dividing $V_{PTAT}$ and $V_{REF}$ by internal resistor values). This can be done in various ways.

Existing types of temperature sensors may use a simple up-down counter (UDC) as part of a feedback loop that generates an output digital temperature word. The output word may be determined by a network of parallel or series resistors, which can occupy a substantial area on an IC. In alternative arrangements a current comparison can be used to generate a varying duty cycle signal that contains information about the ratio between a PTAT current and a reference current, which can be converted into an output digital temperature word.

More complex digital iterative solutions can alternatively be used that may result in a faster settling time. A simple improvement can already be achieved by doubling the UDC step when three successive count-up or count-down commands have taken place. With four successive up- or down commands the UDC step may be quadrupled, and so on. Other solutions are also possible to provide a faster settling time.

The temperature coefficient of a PTAT voltage and a diode voltage are fairly accurate so that it possible to generate reference voltages with very small temperature dependencies. Because the forward voltage drop of a diode between IC processes can vary, the absolute value of the reference voltage $V_{REF}$ is less accurate. This results in an unpredictable offset in the sensor output that can be corrected with a one-point calibration. The slope of the digital output versus temperature can be accurate enough but the absolute value needs to be corrected by checking and correcting the output at one fixed temperature. This is typical for all sensors based on PTAT and REF (PTAT+diode) quantities.

A problem with existing temperature sensor circuits is that the slope of the temperature characteristic (i.e. the digital output word versus temperature) will be not completely monotonic due to resistor mismatch. A two-point calibration may be needed because switching current sources can result in an unpredictable gain error of the temperature characteristic.

SUMMARY

According to a first aspect there is provided a temperature sensor circuit comprising:
- a proportional to absolute temperature (PTAT) voltage circuit configured to provide a PTAT voltage;
- a reference current source connected between a supply rail and a node;
- a capacitor connected between the node and a common rail;
- a reset switch connected across the capacitor;
- a comparator configured to compare a voltage across the capacitor to the PTAT voltage and provide a comparator output;
- a counter circuit configured to increment or decrement an output word depending on the comparator output, the counter circuit configured to repeatedly perform the sequential steps of:
  - i) providing a reset signal to momentarily close the reset switch to discharge the capacitor;

ii) counting a number of clock cycles corresponding to the output word while the capacitor is charged by the reference current source; and iii) incrementing or decrementing the output word depending on the comparator output, wherein, after repeating the sequential steps, the output word converges to a value corresponding to a temperature of the PTAT voltage circuit.

An advantage of the temperature sensor circuit is that it does not have the drawbacks of the above-mentioned examples. The temperature sensor has similar properties as prior examples using multiple resistors but without the corresponding IC area penalty due to the use of a capacitor in place of multiple resistors.

In some examples, a first input of the comparator is connected to the node, and a second input of the comparator is connected to receive the PTAT voltage from the PTAT voltage circuit.

In some examples the counter circuit comprises:

an up/down counter (UDC) having an input connected to receive the comparator output and configured to provide the output word;

a down counter connected to receive the output word from the UDC; and a clock signal generator configured to provide a clock signal to the down counter and the UDC.

In some examples the temperature sensor circuit comprises a sampling switch connected between the node and the first input of the comparator, and a sampling capacitor connected between the first input of the comparator and the common rail, wherein the counter circuit is configured to provide a sampling signal to close the sampling switch after step ii) to provide the voltage across the capacitor to the first input of the comparator.

In some examples, the reference current source comprises a first PMOS transistor having a source connected to the supply rail and a drain connected to the node. A second PMOS transistor may have a source connected to the supply rail and a gate connected to a gate of the first PMOS transistor.

In some examples, the temperature sensor may comprise an amplifier having an output connected to the gates of the first and second PMOS transistors, a first input of the amplifier connected to a drain of the second PMOS transistor and a second input of the amplifier connected to the capacitor.

The temperature sensor circuit may further comprise:

a first resistor and first diode in series connection between the first input of the amplifier and the common rail;

a second resistor connected between the first input of the amplifier and the common rail;

a third resistor connected between the second input of the amplifier and the common rail; and a second diode connected between the second input of the amplifier and the common rail.

The temperature sensor circuit may further comprise:

a third PMOS transistor having a source connected to the supply rail and a drain connected to the second input of the comparator; and a fourth resistor connected between the first input of the comparator and the common rail.

The counter circuit may be configured to output a preset value of the output word on startup of the temperature sensor circuit. The preset value of the output word may correspond to a temperature of between 200 and 600K.

The counter circuit may be configured to increment the output word if the voltage across the capacitor is lower than the PTAT voltage and decrement the output word if the voltage across the capacitor is higher than the PTAT voltage.

According to a second aspect there is provided a method of operating a temperature sensor circuit comprising:

a proportional to absolute temperature (PTAT) voltage circuit configured to provide a PTAT voltage;

a reference current source connected between a supply rail and a node;

a capacitor connected between the node and a common rail;

a reset switch connected across the capacitor;

a comparator configured to compare a voltage across the capacitor to the PTAT voltage and provide a comparator output; and a counter circuit configured to increment or decrement an output word depending on the comparator output, the method comprising the counter circuit:

i) providing a reset signal to momentarily close the reset switch, discharging the capacitor;

ii) counting a number of clock cycles corresponding to the output word while the capacitor is charged by the reference current source;

iii) incrementing or decrementing the output word depending on the comparator output; and iv) repeating steps i) to iii) such that the output word converges to a value corresponding to a temperature of the PTAT voltage circuit.

The output word may be incremented or decremented by a preset number of bits more than one bit if a preset successive number of repeats of steps i) to iii) cause the output word to be respectively incremented or decremented.

The preset successive number of repeats may be three or more and the preset number of bits may be two or more.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
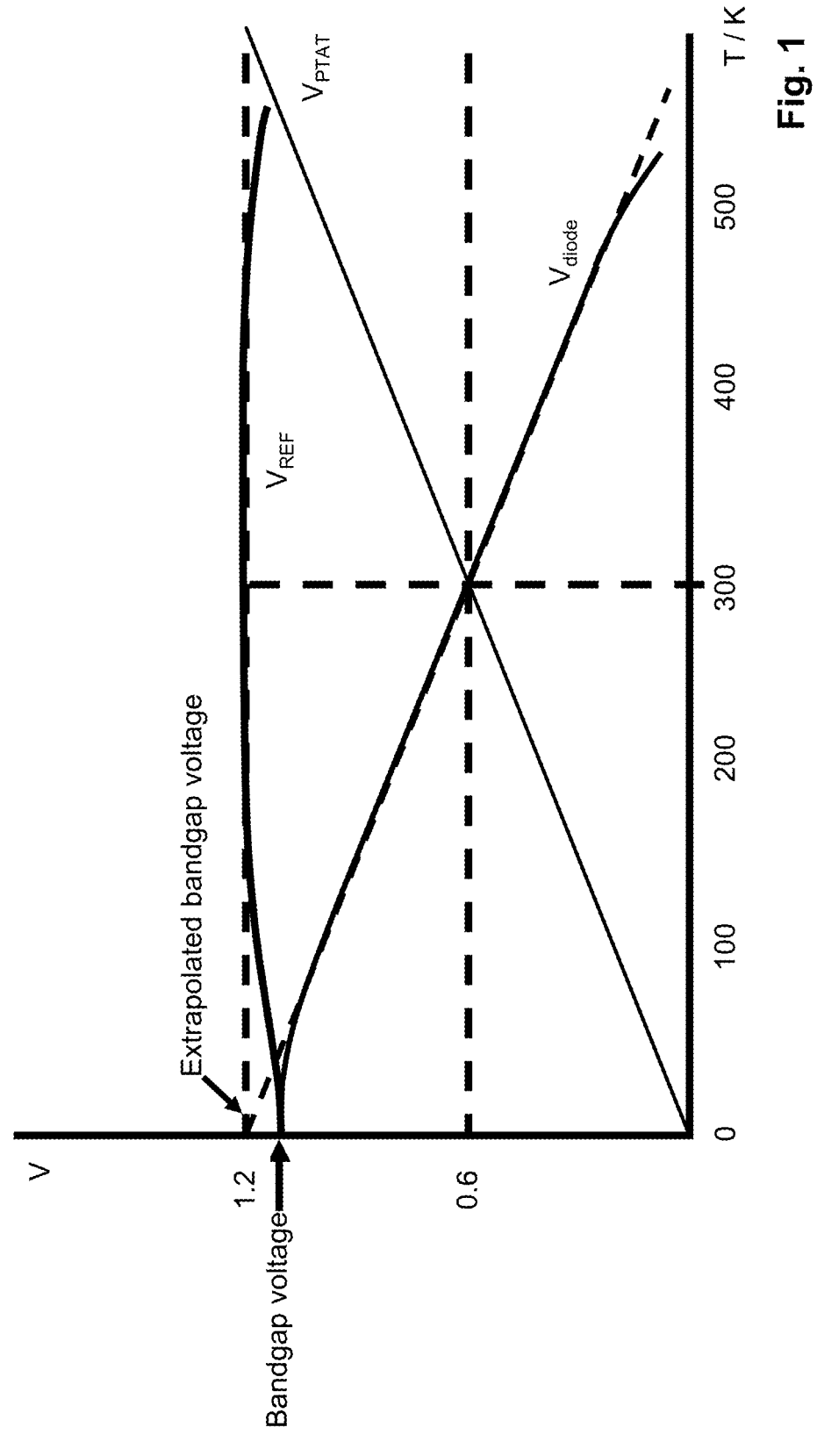
FIG. 1 is a schematic plot of various voltages as a function of temperature.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 2:
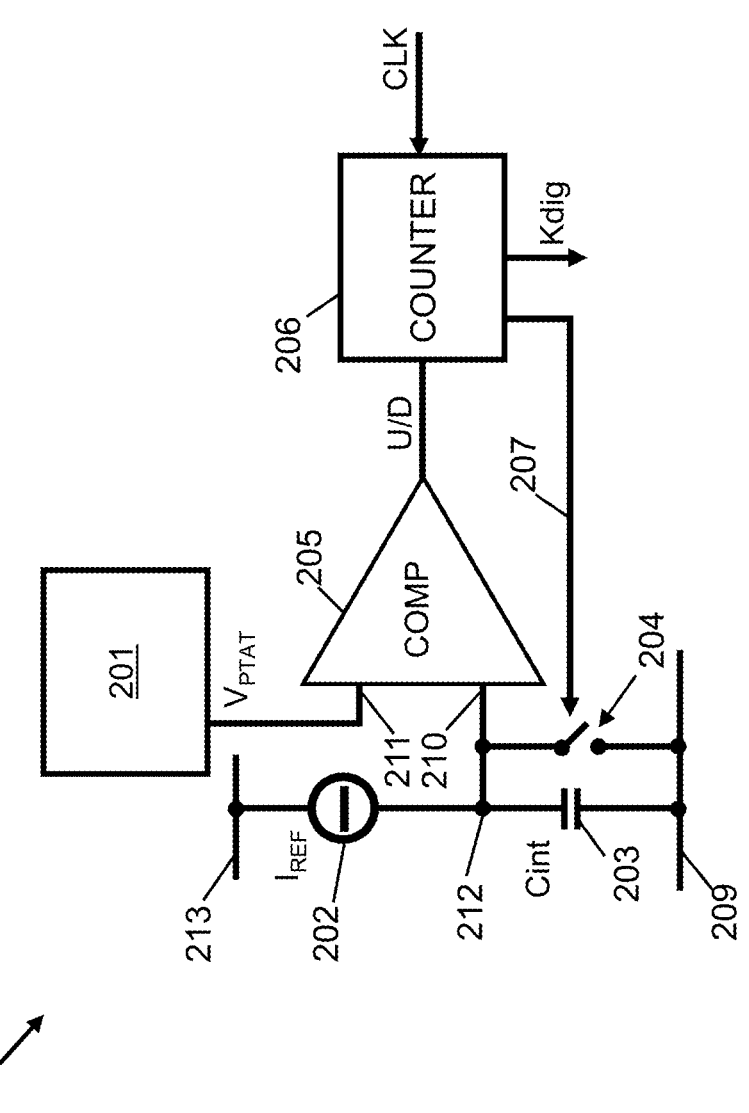
FIG. 2 is a schematic diagram of an example temperature sensor circuit.

FIG. 2 illustrates schematically an example temperature sensor circuit 200 for generating an output digital word Kdig dependent on a PTAT voltage $V_{PTAT}$. The temperature sensor circuit 200 comprises a PTAT voltage circuit 201 configured to provide a PTAT voltage $V_{PTAT}$. The PTAT voltage circuit 201 may for example, as discussed above, be based on a voltage difference between two base to emitter voltages of identical bipolar transistors with a fixed collector current density ratio n (where n≠1) or a voltage difference between two gate to source voltages of two identical MOS transistors, biased in weak inversion, with a fixed drain current density ratio n (where n≠1).

A reference current source 202 is connected between a supply rail 213 and a node 212. Example reference current sources are detailed below. A capacitor 203 is connected between the node 212. and a common rail 209. A reset switch 204 is connected across the capacitor 203, i.e. between the node 212 and the common rail 209.

A comparator 205 is configured to compare a voltage across the capacitor 203 to the PTAT voltage $V_{PTAT}$ from the PTAT voltage source 201 and provide a comparator output U/D. The comparator output is a binary signal that is provide to a counter circuit 206 that is configured to increment or decrement an output digital word Kdig depending on the comparator output U/D. If the voltage across the capacitor 203 is lower than the PTAT voltage $V_{PTAT}$, the comparator output U/D causes the counter 206 to increment the output word Kdig. If the voltage across the capacitor 203 is higher than the PTAT voltage $V_{PTAT}$, the comparator output U/D causes the counter 206 to decrement the output word Kdig.

The counter repeatedly performs a sequence of steps starting with providing a reset signal 207 to momentarily close the reset switch 204 to discharge the capacitor 203. Once the capacitor 203 is discharged, the reset switch 204 is opened and the counter begins counting a number of clock cycles corresponding to the output word Kdig while the capacitor 203 is charged by the reference current source 202. Once the number of clock cycles has completed, the counter circuit 206 then receives the comparator output U/D and increments or decrements the output word Kdig depending on the comparator output U/D.

The counter circuit 206 repeatedly performs the above sequential steps, which causes the output word Kdig to converge to a value that corresponds to a temperature of the PTAT voltage circuit 201. When the temperature is stable, the output word Kdig will tend to oscillate around a stable value, incrementing and decrementing the output word at the end of each cycle.

Figure 3:
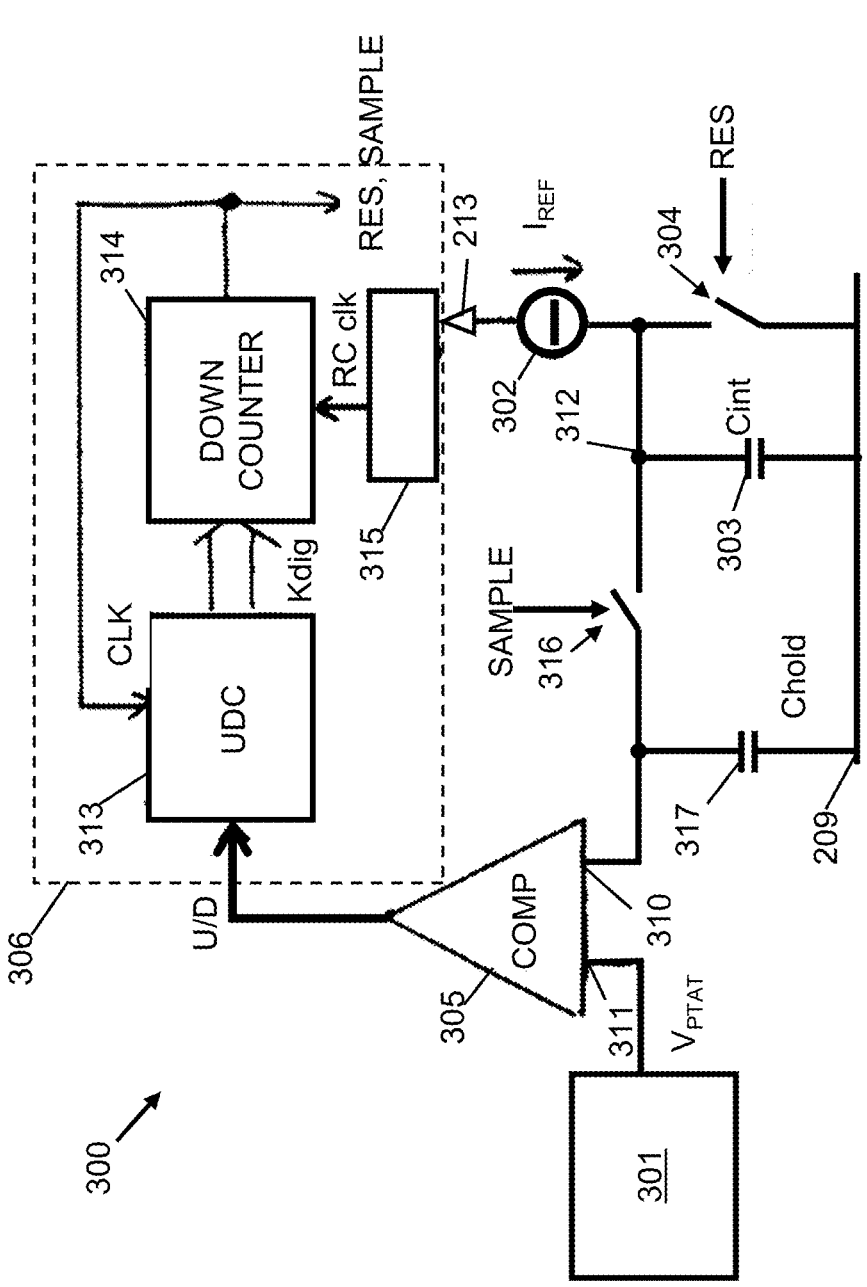
FIG. 3 is a schematic diagram of an alternative example temperature sensor circuit.

FIG. 3 illustrates schematically an example temperature sensor circuit 300, in which the counter circuit 306 is illustrated in further detail and a sampling scheme for sampling the voltage across the capacitor is provided. As with the example circuit of FIG. 2, the temperature sensor circuit 300 comprises a PTAT voltage circuit 301, a reference current source 302 connected between a supply rail 213 and a node 212. A capacitor 303 is connected between the node 312 and a common rail 209. A reset switch 304 is connected across the capacitor 303. A comparator 305 compares a voltage across the capacitor 303 to the PTAT voltage $V_{PTAT}$ and provides a comparator output U/D to the counter circuit 306. A first input 310 of the comparator 305 is connected to the node 312 and a second input of the comparator 305 is connected to receive the PTAT voltage $V_{PTAT}$ from the PTAT voltage circuit 301.

The comparator provides the comparator output in the form of an up/down (U/D) signal to the counter circuit 306. The counter circuit 306 comprises an up/down counter (UDC) 313, a down counter 314 and a clock signal generator 315. The UDC 313 received the comparator output and provides an output word Kdig to the down counter 314. The clock signal generator 315 provides a clock signal RC clk to the down counter 314 and the UDC 313.

A sampling switch 316 is connected between the node 312 and the first input 310 of the comparator 305. A sampling capacitor 317 is connected between the second input of the comparator 902 and the common rail 209. The counter circuit 306 provides a sampling signal to close the sampling switch 316 after counting the number of clock cycles corresponding to the output word Kdig to provide the voltage across the capacitor 303 to the first input 310 of the comparator 305.

The clock signal generator 315 may be a local RC oscillator (i.e. an oscillator that uses a resistor and capacitor that are internal in the IC). The UDC contents Kdig are loaded into the down counter 314. After a reset pulse (with the duration of one clock pulse for instance) provided by the down counter 314 to the reset switch 304 that discharges capacitor 303 completely, the down counter 314 counts down from Kdig to zero over successive clock cycles. The total period to count down from Kdig to zero may therefore be a time period of Kdig·Tclk, i.e. a period determined from the UDC contents multiplied by the clock signal period. During this time, the capacitor 303 is charged with the reference current $I_{REF}$. Once the down counter 314 has reached zero, the voltage across the capacitor 303 is sampled by providing a sampling signal to close the sampling switch, which charges the sampling capacitor 317, providing the voltage across the capacitor 303 to the first input 310 of the comparator 305. The sampling signal may for example be provided for one clock cycle. The cycle then repeats, with the contents Kdig of the UDC 313 again being provided to the down counter 314.

After settling, the contents Kdig of the UDC 313 represent the measured temperature. As described above, the contents will toggle between two values with a difference of one LSB.

The clock signal generator 315 can be designed in such a way that the clock period Tclk is equal to Rosc·Cosc, where Rosc and Cosc are the resistor and capacitor in the clock signal generator 315 defining the clock signal frequency. With $V_{PTAT}$=a·T (where a is a constant and T is the absolute temperature) and with the reference current $I_{REF}$=Vref/Rref $$V_{PTAT} = Iref \cdot Kdig \cdot Tclk / Cint$$

$$T = (Vref \cdot Kdig \cdot Rosc \cdot Cosc) / (a \cdot Rref \cdot Cint)$$

So $$Kdig = (a \cdot T \cdot Rref \cdot Cint) / (Vref \cdot Rosc \cdot Cosc) = kT$$

The UDC contents Kdig are therefore proportional to temperature and the process and temperature variations of the internal resistors and capacitors are cancelled out. Although the absolute values of Rref and Rosc may vary over process and temperature, their ratio can be made very accurate. The same is true for the ratio Cint/Cosc.

The speed of operation of the circuit 300, i.e. the time taken for the circuit to settle, will depend on the difference between the sampled voltage and $V_{PTAT}$. This is because the UDC contents are first converted in an integration time for Cint with the down counter 314, following which the momentary voltage of Cint is sampled in Chold and compared with the PTAT voltage $V_{PTAT}$. The comparator output responds with a U/D signal for the UDC 313, which will then receive only one clock pulse to count either up or down. A low value of Kdig corresponds to a low integration time, so the circuit is faster for low Kdig values than for high Kdig values. Pre-selecting the initial UDC value at start-up can therefore reduce the settling time required. A further optimisation may be to use a different digital iterative routine where Kdig starts with larger steps.

Figure 4:
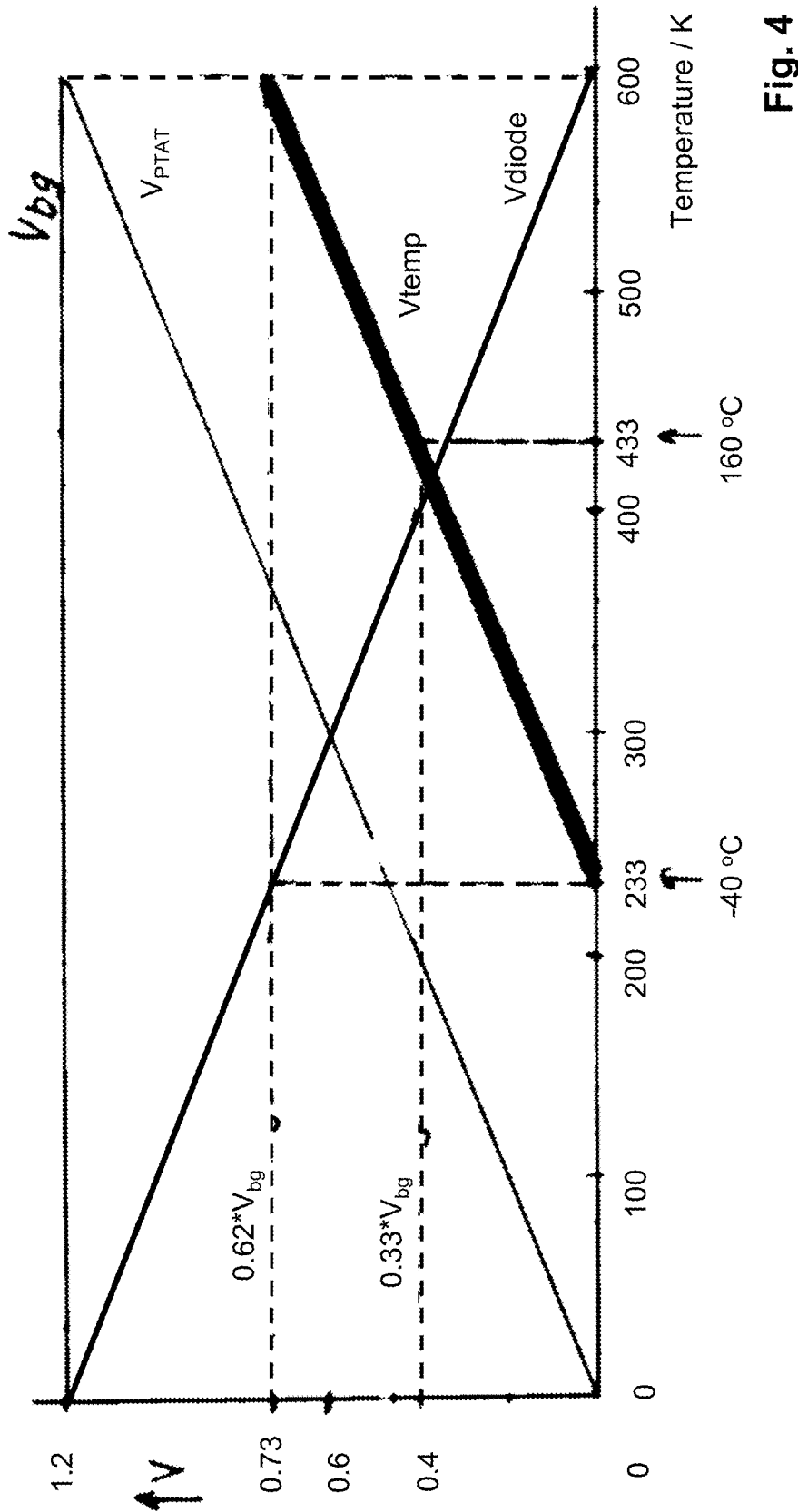
FIG. 4 is a schematic plot of voltage as a function of temperature for the circuit of FIG. 3.

In the above example, Kdig=0 corresponds to a temperature of OK. In the simplified linearized graph shown in FIG. 4, a temperature voltage Vtemp is used instead of Vptat in order to change the Kdig=0 value to a higher initial value of −40° C. or 233K.

Here, a bandgap reference voltage Vref=Vbg ($V_{PTAT}$+ Vdiode) is used as reference. Vtemp=k·Vbg−$V_{diode}$, where k=0.62, which is chosen such that Vtemp=0V for T=233° K (−40° C.) and 0.33.Vbg (0.4V in this assumption) for T=433° K (160° C.).

Vtemp is used instead of Vptat in the system, resulting in Kdig=0 for T=−40° C. and dimensioned in such a way that Kdig=127 (assuming 7 bit counters in this example, so 127 is full scale) corresponds with T=160° C. for instance.

The above is just an example to indicate that it is possible to choose any temperature corresponding to the interval Kdig=0 to Kdig=$2^n$−1 with n being the number of bits from the counters. The voltages in this example are just assumptions, chosen to indicate the calculation method.

Figure 5:
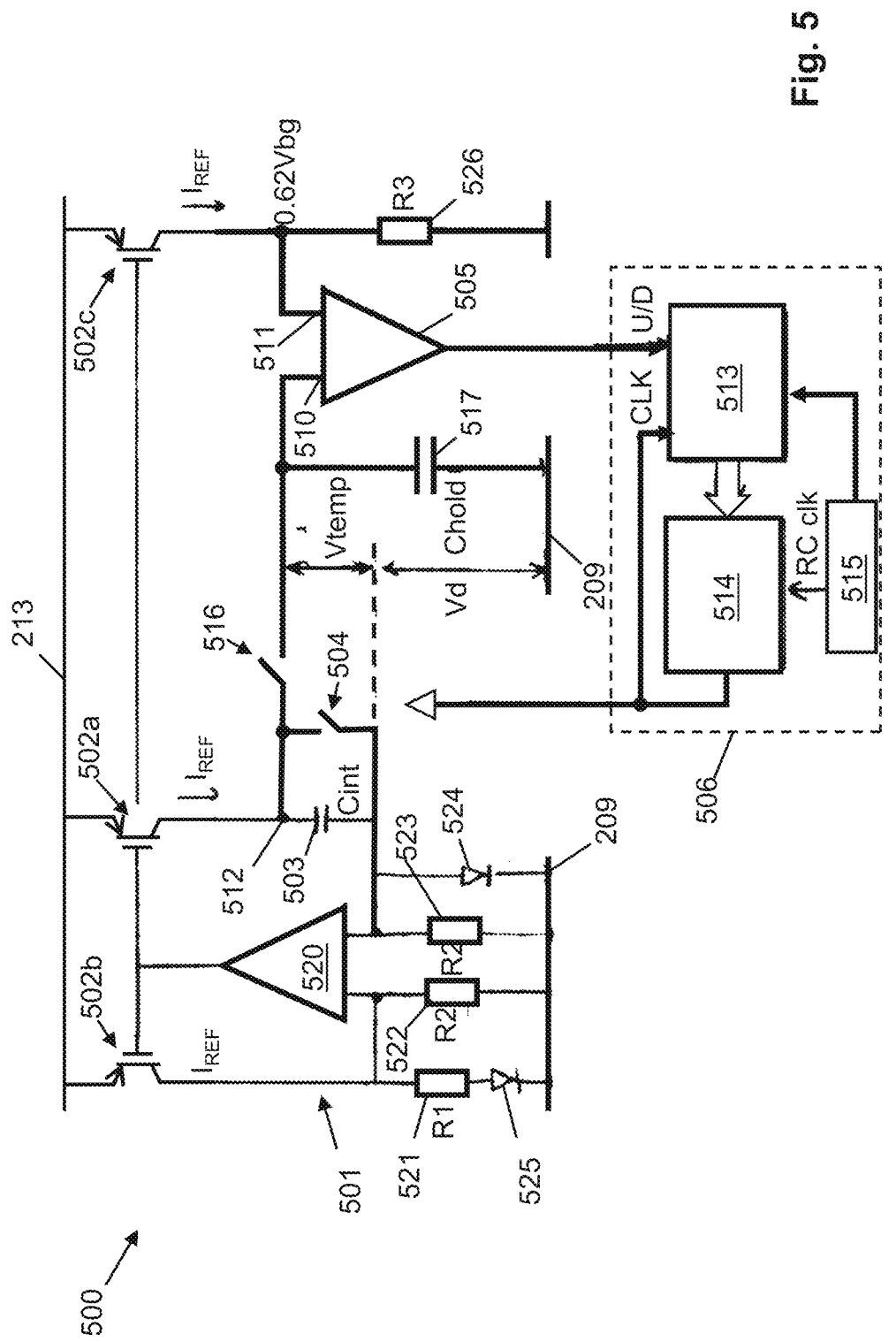
FIG. 5 is a schematic diagram of the example temperature sensor circuit of FIG. 2 with a reference current circuit.

A further example temperature sensor circuit 500 incorporating an example reference current circuit 501 is illustrated in FIG. 5. The reference current circuit 501 generates a PTAT current source from identical PMOS transistors forcing current through two branches with different multiplication factors.

As with the circuits described above in relation to FIGS. 2 and 3, the temperature sensor circuit 500 comprises a PTAT voltage circuit 501 and a reference current source 502a connected between a supply rail 213 and a node 212. A capacitor 503 is connected between the node and the common rail 209. A reset switch 504 is connected across the capacitor 503. A comparator 505 compares a voltage across the capacitor 503 to the PTAT voltage and provides a comparator output U/D. A counter circuit 506 increments an output word Kdig depending on the comparator output and repeatedly performs a series of sequential steps, in which a reset signal 207 is momentarily provided to close the reset switch 504 to discharge the capacitor 503, a number of clock cycles is counted corresponding to the output word while the capacitor 503 is charged by the reference current source 502a and the output word is incremented or decremented depending on the comparator output.

The counter circuit 506 comprises a UDC 513 having an input connected to receive the comparator output U/D and configured to provide the output word (Kdig). A down counter 514 is connected to receive the output word Kdig from the UDC 513. A clock signal generator 515 is configured to provide a clock signal RC clk to the down counter 514 and the UDC 513.

The reference current source 501 comprises a first PMOS transistor 502a having a source connected to the supply rail 213 and a drain connected to the node 512. A second PMOS transistor 502b has a source connected to the supply rail 213 and a gate connected to a gate of the first PMOS transistor 502a. An amplifier 520 has an output connected to the gates of the first and second PMOS transistors 502a, 502b. A first input of the amplifier 520 is connected to a drain of the second PMOS transistor 502b and a second input of the amplifier 520 is connected to the capacitor 503.

A first resistor R1 521 and first diode 522 are in series connection between the first input of the amplifier 520 and the common rail 209 A second resistor R2 523 is connected between the first input of the amplifier 520 and the common rail 209. A third resistor 524 is connected between the second input of the amplifier 520 and the common rail 209. A second diode 525 is connected between the second input of the amplifier 520 and the common rail 209.

A third PMOS transistor 502c has a source connected to the supply rail 213 and a drain connected to the second input 511 of the comparator 505. A fourth resistor 526 is connected between the second input 511 of the comparator 505 and the common rail (209).

As with the circuit 300 in FIG. 3, a sampling switch 516 is connected between the node 512 and the first input 510 of the comparator 505. A sampling capacitor 517 is connected between the first input 310 of the comparator 505 and the common rail 209. The counter circuit 506 is configured to provide a sampling signal to close the sampling switch 516 after counting the number of clock cycles corresponding to the output word Kdig to provide the voltage across the capacitor 503 to the first input 510 of the comparator 505.

As with the circuit 300 in FIG. 3, the counter circuit 506 comprises a UDC 513, a down counter 514 and a clock signal generator 515. Operation of the circuit 500 starts with capacitor Cint 503 being discharged completely by a reset signal to the reset switch 504. The down counter 514 is then loaded with the momentary contents of the UDC 513, after which the down counter 514 starts counting down to zero. During that time, the capacitor Cint 503 is charged with the reference current $I_{REF}$. When the down counter 514 contents reach zero, the sampling switch 516 is closed and Cint 503 is connected to the sampling capacitor 517. The cycle then starts again (reset, count down and charge, sample etc).

When the system is settled, the voltage at the capacitor $C_{hold}$ is $V(C_{hold})=V_d+V_{temp}=V_d+Kdig·Tclk·I_{REF}/$ Cint=$I_{REF}$·R3 (which is 0.62.Vbg in this example).

The reference current $I_{REF}$ that runs through the middle PMOS transistor 502a in the circuit of FIG. 5 is either running through the capacitor Cint 503 or through the reset switch 504. When the circuit 500 has settled, closing the sampling switch 516 will not result in an extra current running through the sampling switch 516 because the capacitor $C_{hold}$ 517 is already charged to the proper value. This means that all the current from the middle PMOS transistor 502a runs through the 1× diode 524 and the resistor R2 523 in parallel with this, thereby ensuring proper functioning of the $I_{REF}$ current source.

When settled, the UDC 513 toggles between two succeeding values (a higher and a lower value, which differ by one LSB). Depending on the choice the designer made, the higher or lower value is loaded in the down counter 514.

The temperature sensor circuit 500 may be implemented in various ways. A common feature is that that the time taken to charge the capacitor Cint 503, which is expressed as the number of clock pulses, is proportional to the temperature dependent voltage. The number of clock pulses is therefore an indication of the actual temperature.

Figure 6:
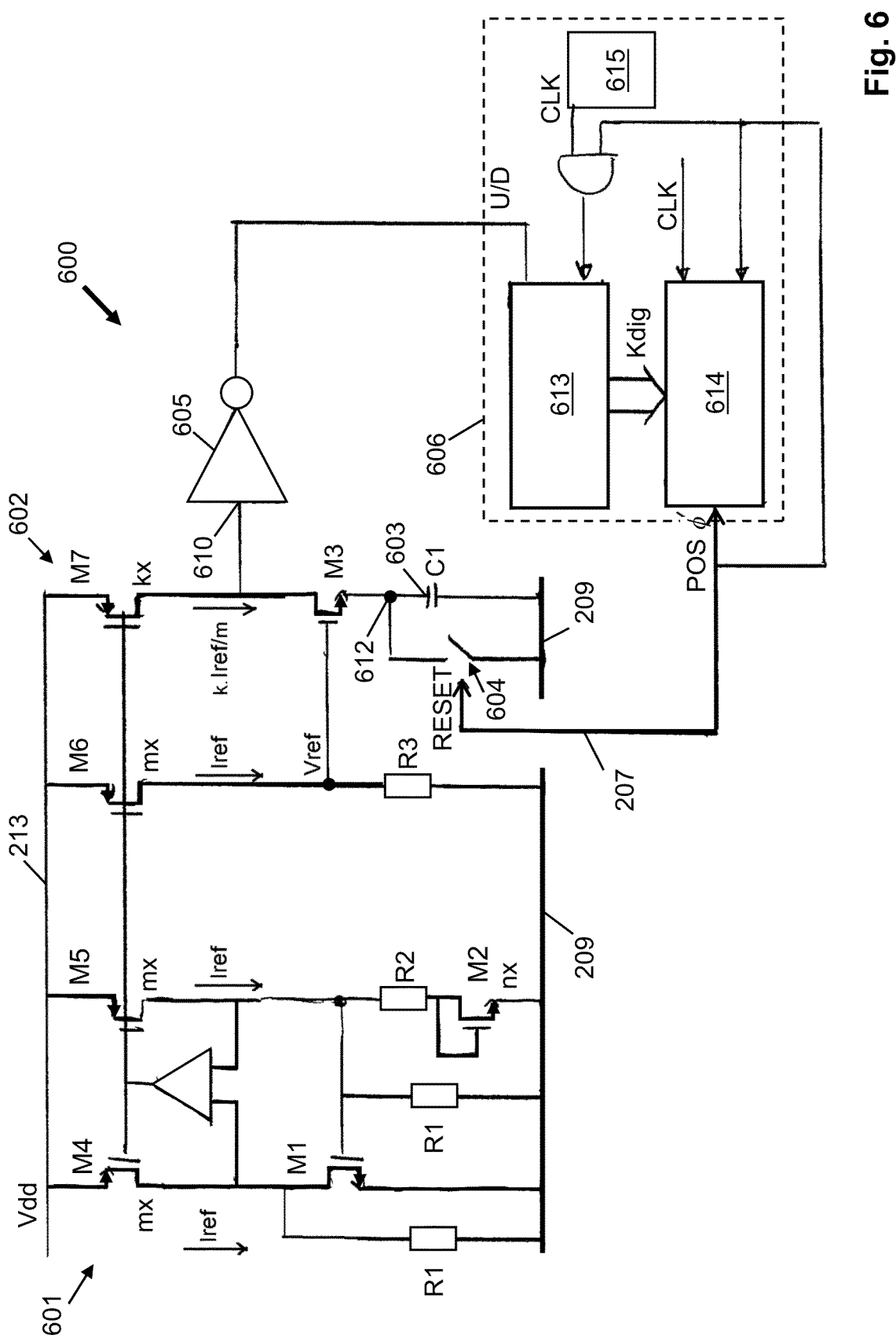
FIG. 6 is a schematic diagram of a further example temperature sensor circuit.

For low supply voltages, the use of PN (substrate) diodes in the reference current generator may not be possible because the diode voltage drop may be too high for an amplifier with a PMOS input stage (the input voltage would be at $V_{diode}$; when the amplifier input would be the gates of PMOS transistors, the source voltage of these transistors would be $V_{diode}+V_{GS(PMOS)}$, which can be too high when the total supply voltage is very low (900 mV for instance)) and too low for an NMOS input stage ($V_{diode}-V_{GS(NMOS)}$ will be too low to implement tail current sources). A solution to this is to realize the reference current generator with MOS transistors only. The input voltage of the amplifier can be a few hundred millivolts in that case and an amplifier with PMOS input transistors can be used. The circuit 600 in FIG. 6 illustrates a possible implementation.

As with the other examples, the temperature sensor circuit 600 comprises a PTAT voltage circuit 601 and a reference current source 602, i.e. transistor M7, which is connected between a supply rail 213 and a node 212. A capacitor 603 is connected between the node 612 and a common rail 209. A reset switch 604 is connected across the capacitor 603. A comparator 605 compares a voltage across the capacitor 603 to a PTAT voltage, in this case Vref, and provides a comparator output U/D to a counter circuit 606. The counter circuit 606 increments or decrements an output word Kdig depending on the comparator output U/D and performs the sequential steps of providing a reset signal 207 to the reset switch to discharge the capacitor 603, counting a number of clock cycles corresponding to the output word while the capacitor 603 is charged by the reference current source 602 and incrementing or decrementing the output word Kdig depending on the comparator output.

Resistors R1 and R2 in the PTAT voltage circuit 601 can be selected such that the PMOS currents in transistors M4-M7 are (temperature independent) reference currents. It is also possible to omit the left R1 resistor connected to the drain of transistor M1 (this has some practical advantages) and still have reference currents in the upper PMOS transistors M4-M7.

The circuit 600 is configured such that if the comparator input 610 is at a voltage where its output is halfway high and low (and its drain current is identical to the drain current of transistor M7), the voltage at the source of transistor M3 will be the earlier described $V_{temp}$ (k·Vbg−Vgs). $V_{temp}$ is then again chosen in such a way that the low and high temperature, corresponding to Kdig=0 and Kdig is maximal, are fixed.

After a reset pulse, capacitor C1 603 is discharged and the comparator input 610 is pulled low. After that, the down counter 614, which is already loaded with the UDC contents Kdig, starts counting down to zero. During that time, capacitor C1 603 is charged with the drain current of transistor M7, which is a reference current that is dimensioned at the proper value (k·Iref/m where k and m are the multiplication factors of the PMOS transistors as indicated in the drawing). When the down counter contents is zero, the UDC receives one clock pulse which will result in a up or down count action, depending on the comparator (an inverter in this case) output. The loop is settled when C1 is charged to the voltage where drain voltage of M3 starts rising. In that case:

$$Vref =$$
$$Iref \cdot R3 = V(C1) + Vgs(M3) = (Kdig \cdot Tclk \cdot Iref \cdot k/m)/C1 + Vgs(M3),$$

where Vgs(M3) is the gate to source voltage of M3 when its drain current is k·Iref/m while its drain voltage is somewhere half way the supply voltage (the voltage where the output of the comparator (inverter) changes state). So here the designed temperature voltage $V_{temp}$ is:

$$Vtemp = Vref - Vgs(M3) = Iref \cdot R3 - Vgs(M3)$$

As a result, the gate to source voltage of a MOS transistor is used instead of a diode voltage.

The reference voltage Vref may be selected such that Vref=Vgs(M3) @ 0° C.

This value may vary with process corner. In a nominal process corner, $V_{temp}$=0V @ 0° C. There may be an offset between different process corners but the gain is fairly constant, i.e. the $\Delta Vgs/\Delta T$ slopes are generally parallel. Therefore, with a one point calibration the voltage $V_{temp}$ can be used for temperature measurement.

When Vref is adjusted for different process corners such that $V_{temp}$ is the same for each corner at 20° C., the deviation from a nominal curve is around −1.2 to +0.9% up to a maximum T=40° C., as shown in the table below.

| Vtemp | Process Corners | | |
| | SS | TT | FF |
| --- | --- | --- | --- |
| 0° C. | −0.1 mV | 0 mV | 0.5 mV |
| 40° C. | 33.0 mV | 32.7 mV | 32.3 mV |

Vtemp can be measured by comparing it to the internally generated reference voltage Vref. The ratio Vtemp/Vref is converted in a digital word Kdig. The one point calibration may then fix Kdig at 64 for T=20° C., summarised in the table below.

| Kdig | SS | TT | FF |
| --- | --- | --- | --- |
| 0° C. | 2.0 | 0.5 | −0.3 |
| 40° C. | 123.4 | 124.7 | 125.4 |

Measuring Vtemp relative to Vref is therefore sufficient for the required temperature sensor.

To reduce settling time, the UDC step may be doubled when multiple successive count-up or count-down commands have taken place, for example three successive commands. With four successive up- or down commands the UDC step may be quadrupled.

Figure 7:
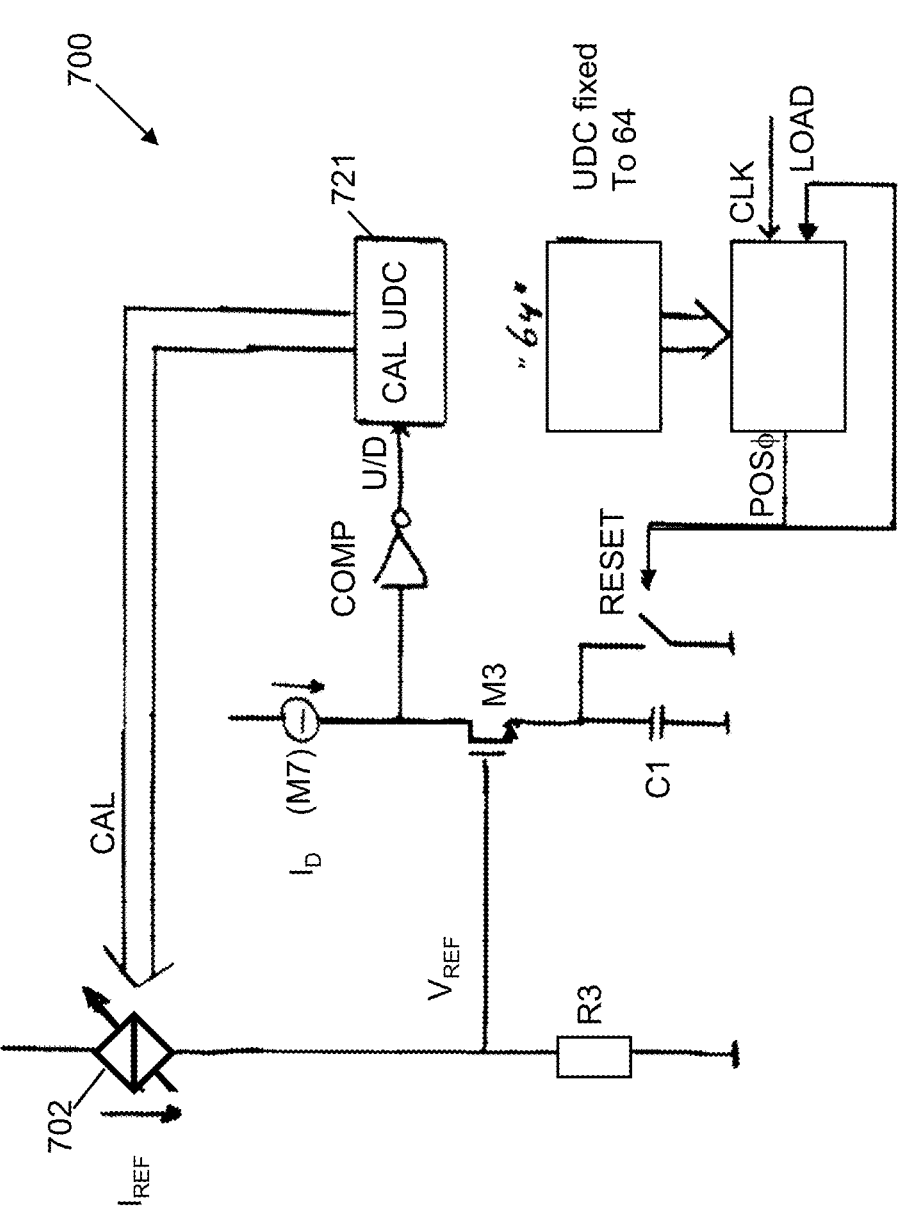
FIG. 7 is a schematic diagram of a calibration mode for an example temperature sensor circuit.
Figure 8:
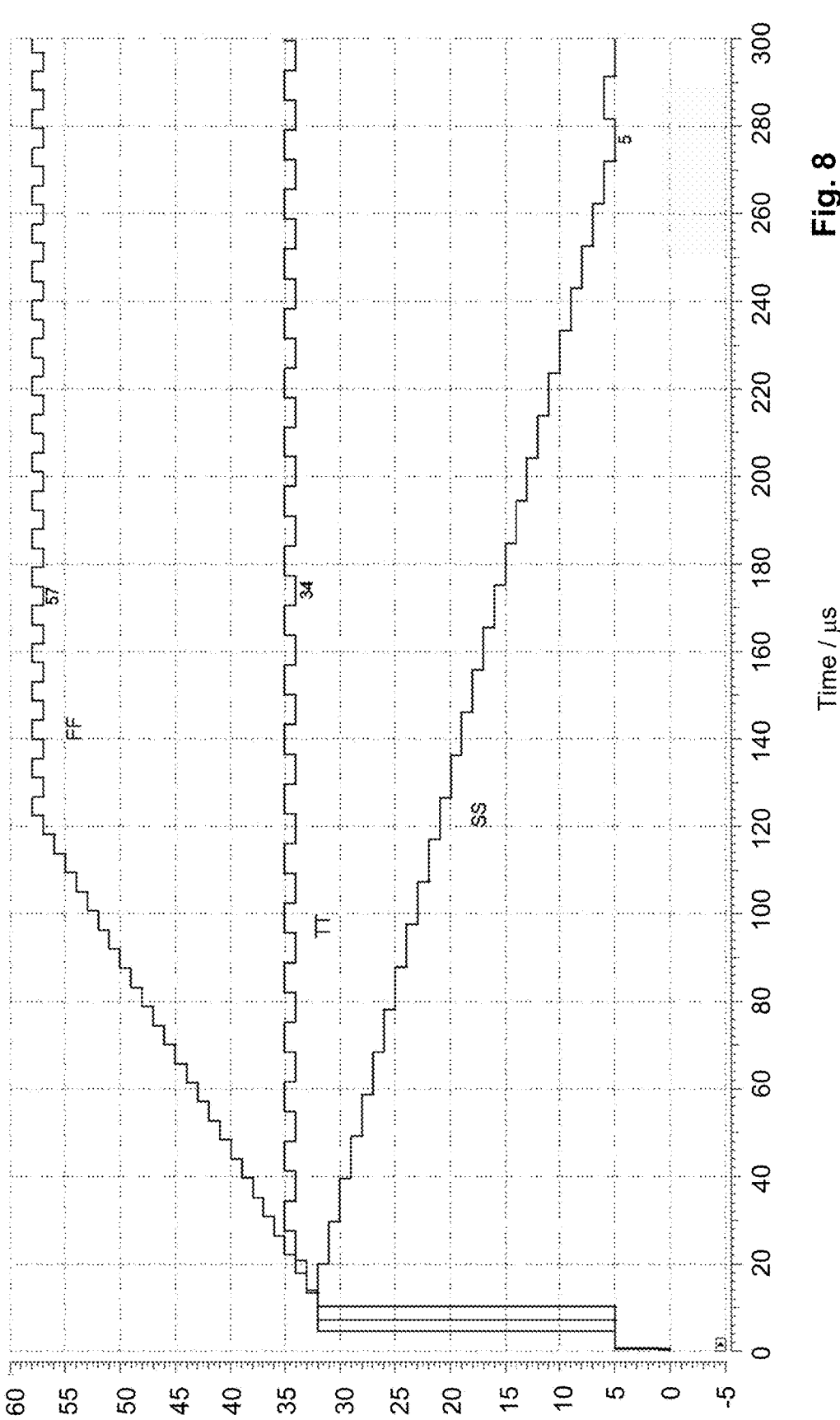
FIG. 8 is a plot of output temperature dependent voltage as a function of time for different process corners.

As mentioned above, a one-point calibration is may be carried out based on the ratio between a PTAT and a REF quantity. FIG. 7 illustrates a temperature sensor circuit 700, which is a simplified form of the circuit 600 of FIG. 6. The component values in the circuit 700 are chosen such that 0° C. corresponds with Kdig=0 and 40° C. corresponds with Kdig=127. This is, however, only true in the typical process corner. For other corners, the NMOS gate source voltage may be different, resulting in a substantial offset. To compensate for these offsets, a calibration mode may be defined as: at a temperature of 20° C., the UDC is fixed at "64" (the required Kdig value at this temperature) and a 6-bit calibration up-down counter 721 adjusts the reference current source 702 until the loop is settled. During normal operation, the setting of the calibration UDC 721 is set to the result of the calibration mode. FIG. 8 illustrate the results of this calibration for the SS, TT and FF process corners. For the SS process corner, the output word converges to 5V, for the TT process corner 34V and for the SS process corner 57V.

Figure 9:
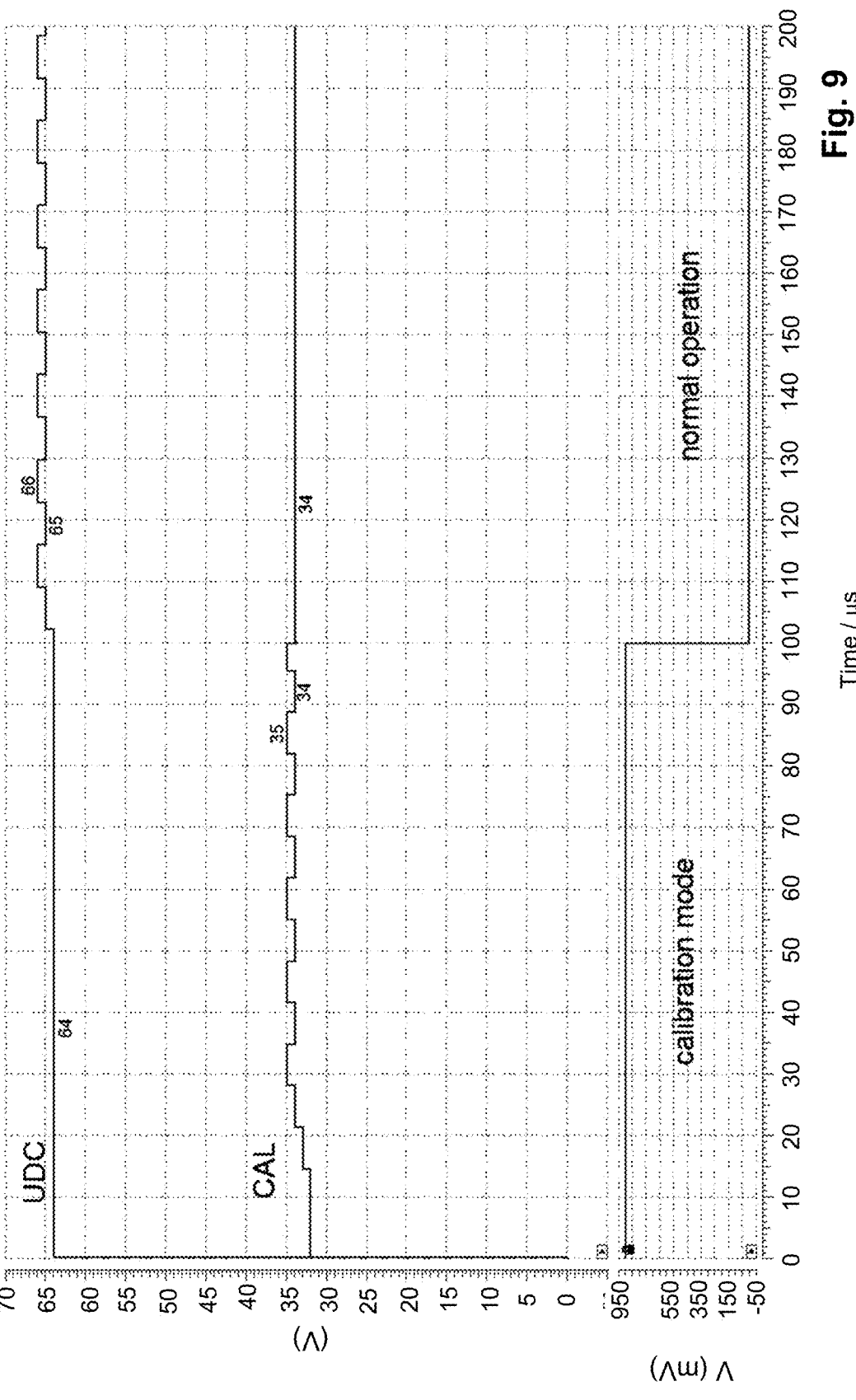
FIG. 9 is a plot of output temperature dependent voltage as a function of time during a calibration mode followed by normal operation.

In a nominal simulation at 20° C., illustrated in FIG. 9, the system is first switched to calibration mode and then to normal operation. The lower result of the calibration mode CAL is transported to the normal operation mode (the lower toggle value).

Figure 10:
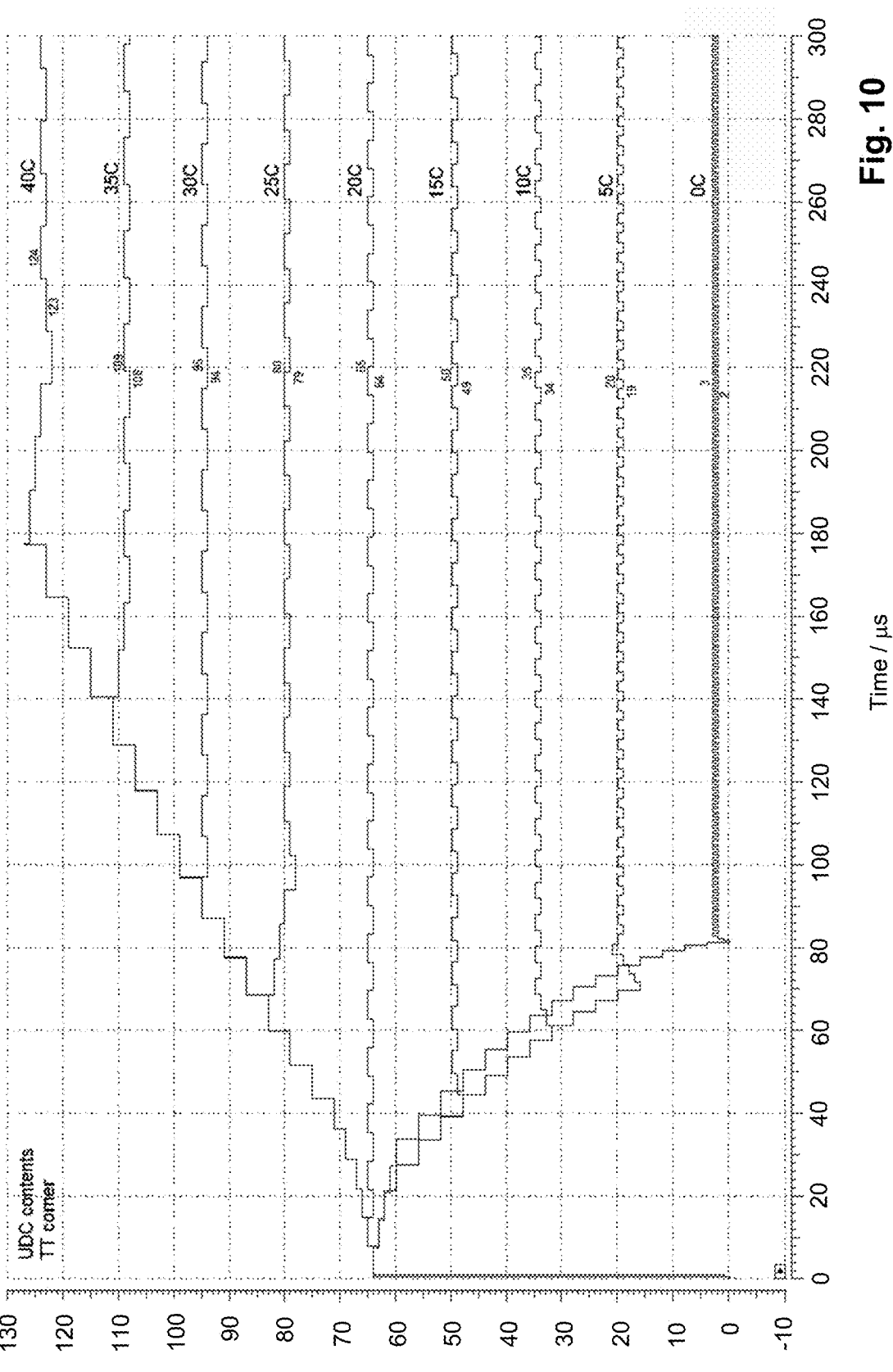
FIG. 10 is a plot of UDC contents as a function of time for different temperatures.

The plot in FIG. 10 shows the UDC contents in the typical TT process corner when CAL is set to 34 and the temperature is stepped from 0 to 40° C. in steps of 5° C. In this example an ideal RC oscillator is used based on an internal R and C.

Monte Carlo simulations show that if the system is perfectly calibrated for T=20° C., the deviation for the reading for T=0° C. or T=40° C. is 0.2° (1σ) or 0.6° (3σ) due to mismatch. A temperature sensor circuit based on the examples described herein can thereby provide reasonable accuracy with a reduced IC area.

From reading the present disclosure, other variations and modifications will be apparent to the skilled person. Such variations and modifications may involve equivalent and other features which are already known in the art of IC temperature sensor circuits, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A temperature sensor circuit comprising:
a proportional to absolute temperature (PTAT) voltage circuit configured to provide a PTAT voltage;
a reference current source connected between a supply rail and a node;
a capacitor connected between the node and a common rail;
a reset switch connected across the capacitor;
a comparator configured to compare a voltage across the capacitor to the PTAT voltage and provide a comparator output;
a counter circuit configured to increment or decrement an output word depending on the comparator output, the counter circuit configured to repeatedly perform the sequential steps of:
i) providing a reset signal to momentarily close the reset switch to discharge the capacitor;

ii) counting a number of clock cycles corresponding to the output word while the capacitor is charged by the reference current source; and
iii) incrementing or decrementing the output word depending on the comparator output,
wherein, after repeating the sequential steps, the output word converges to a value corresponding to a temperature of the PTAT voltage circuit.

2. The temperature sensor circuit of claim 1, wherein:
a first input of the comparator is connected to the node; and
a second input of the comparator is connected to receive the PTAT voltage from the PTAT voltage circuit.

3. The temperature sensor circuit of claim 2, wherein the counter circuit comprises:
an up/down counter (UDC) having an input connected to receive the comparator output and configured to provide the output word;
a down counter connected to receive the output word from the UDC; and
a clock signal generator configured to provide a clock signal to the down counter and the UDC.

4. The temperature sensor circuit of claim 3, comprising:
a sampling switch connected between the node and the first input of the comparator;
a sampling capacitor connected between the first input of the comparator and the common rail,
wherein the counter circuit is configured to provide a sampling signal to close the sampling switch after step ii) to provide the voltage across the capacitor to the first input of the comparator.

5. The temperature sensor circuit of claim 4, wherein the reference current source comprises a first PMOS transistor having a source connected to the supply rail and a drain connected to the node.

6. The temperature sensor circuit of claim 5, comprising a second PMOS transistor having a source connected to the supply rail and a gate connected to a gate of the first PMOS transistor.

7. The temperature sensor circuit of claim 6, comprising an amplifier having an output connected to the gates of the first and second PMOS transistors, a first input of the amplifier connected to a drain of the second PMOS transistor and a second input of the amplifier connected to the capacitor.

8. The temperature sensor circuit of claim 7, comprising:
a first resistor and first diode in series connection between the first input of the amplifier and the common rail;
a second resistor connected between the first input of the amplifier and the common rail;
a third resistor connected between the second input of the amplifier and the common rail; and
a second diode connected between the second input of the amplifier and the common rail.

9. The temperature sensor circuit of claim 8, comprising:
a third PMOS transistor having a source connected to the supply rail and a drain connected to the second input of the comparator; and
a fourth resistor connected between the first input of the comparator and the common rail.

10. The temperature sensor circuit claim 1, wherein the counter circuit is configured to output a preset value of the output word on startup of the temperature sensor circuit.

11. The temperature sensor circuit of claim 10, wherein the preset value of the output word corresponds to a temperature of between 200 and 600K.

12. The temperature sensor circuit of claim 1, wherein the counter circuit is configured to increment the output word if the voltage across the capacitor is lower than the PTAT voltage and decrement the output word if the voltage across the capacitor is higher than the PTAT voltage.

13. A method of operating a temperature sensor circuit comprising a proportional to absolute temperature, PTAT, voltage circuit configured to provide a PTAT voltage, a reference current source connected between a supply rail and a node, a capacitor connected between the node and a common rail, a reset switch connected across the capacitor, a comparator configured to compare a voltage across the capacitor to the PTAT voltage and provide a comparator output, and a counter circuit configured to increment or decrement an output word depending on the comparator output, the method comprising:

i) providing, by the counter circuit, a reset signal to momentarily close the reset switch, discharging the capacitor;

ii) counting, by the counter circuit, a number of clock cycles corresponding to the output word while the capacitor is charged by the reference current source;

iii) incrementing or decrementing, by the counter circuit, the output word depending on the comparator output; and iv) repeating steps i) to iii) such that the output word converges to a value corresponding to a temperature of the PTAT voltage circuit.

14. The method of claim 13, further comprising:

incrementing or decrementing the output word by a preset number of bits more than one bit if a preset successive number of repeats of steps i) to iii) cause the output word to be respectively incremented or decremented.

15. The method of claim 14, wherein the preset successive number of repeats is three or more and the preset number of bits is two or more.

16. The method of claim 13, further comprising:

outputting, by the counter circuit, a preset value of the output word on startup of the temperature sensor circuit.

17. The method of claim 16, wherein the preset value of the output word corresponds to a temperature of between 200 and 600K.

18. The method of claim 13, further comprising:

incrementing, by the counter circuit, the output word if the voltage across the capacitor is lower than the PTAT voltage and decrements the output word if the voltage across the capacitor is higher than the PTAT voltage.

19. The method of claim 13, wherein a first input of the comparator is connected to the node, and a second input of the comparator is connected to receive the PTAT voltage from the PTAT voltage circuit.

20. The method of claim 19, wherein the counter circuit comprises an up/down counter (UDC) having an input connected to receive the comparator output and configured to provide the output word, a down counter connected to receive the output word from the UDC, and a clock signal generator configured to provide a clock signal to the down counter and the UDC.

\* \* \* \* \*